US009762658B2

United States Patent
Batla et al.

(10) Patent No.: US 9,762,658 B2
(45) Date of Patent: Sep. 12, 2017

(54) DYNAMIC RECONFIGURABLE CLIENT SIDE BEACONING

(71) Applicant: Verizon Digital Media Services Inc., Playa Vista, CA (US)

(72) Inventors: Hani Batla, Teaneck, NJ (US); Ted Middleton, Moorpark, CA (US); Dennis Au, Torrance, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 365 days.

(21) Appl. No.: 14/503,597

(22) Filed: Oct. 1, 2014

(65) Prior Publication Data

US 2016/0099849 A1    Apr. 7, 2016

(51) Int. Cl.
| | |
|---|---|
| *H04L 29/08* | (2006.01) |
| *H04L 12/24* | (2006.01) |
| *H04L 12/26* | (2006.01) |
| *H04L 29/06* | (2006.01) |

(52) U.S. Cl.
CPC .......... *H04L 67/10* (2013.01); *H04L 41/0803* (2013.01); *H04L 41/0813* (2013.01); *H04L 41/142* (2013.01); *H04L 43/04* (2013.01); *H04L 67/02* (2013.01); *H04L 67/125* (2013.01); *H04L 67/22* (2013.01); *H04L 67/306* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 9,239,750 B1* | 1/2016 | Lakshminarayanan | H04N 21/44209 |
| 2006/0015513 A1* | 1/2006 | Poyhonen | H04L 29/12283 |
| 2011/0185041 A1* | 7/2011 | Hunt | H04L 65/1069 709/219 |
| 2014/0258523 A1* | 9/2014 | Kazerani | H04L 43/08 709/224 |

* cited by examiner

*Primary Examiner* — Kevin Bates
*Assistant Examiner* — Lesa Kennedy
(74) *Attorney, Agent, or Firm* — Los Angeles Patent Group; Arman Katiraei (57) ABSTRACT

Some embodiments provide a monitoring system for a distributed platform. The monitoring system dynamically controls the monitoring and reporting function of client applications running on user devices using a plurality of configurations. The system distributes different configurations to different client applications to control the monitoring and reporting of each client application independently. The system distributes different configurations to the same client application at different times in order to dynamically reconfigure the reporting function of that client application. The system compiles metrics from the client applications in order to generate custom performance reports for different content providers and identify performance issues. In response to a detected issue, the system can automatically reconfigure affected client applications to better diagnose the issue with increased reporting. The system can also issue alerts for others to take corrective action. The system can also self-heal by commanding operation of the affected client applications.

17 Claims, 7 Drawing Sheets

DYNAMIC RECONFIGURABLE CLIENT SIDE BEACONING

BACKGROUND INFORMATION

Content distributors including content delivery networks (CDNs), cloud hosting service providers, and other large-scale distributed caching or proxy services are tasked with delivering content on behalf of other content providers or content originators. The content distributors typically have a distributed footprint that allows them to deliver the content more efficiently by reducing the distance and number of hops that the content travels to reach different subsets of users and by providing a scalable infrastructure that can increase or decrease the number of resources devoted to delivery of specific content in order to meet spikes in content demand. As such, content providers can focus on content origination and rely on the content distributors for the dissemination of their content.

Ensuring the optimal delivery of content to all users in all geographic regions at all times is a significant challenge for any content distributor. There are many factors outside the content distributor control that can result in degraded content delivery performance and degrade end user experiences. Issues can arise from within the content distributor's own platform, the user devices receiving and presenting the content, the networks over which the content is delivered, and the content providers that encode or otherwise provide the content for the content distributor to disseminate.

Issues within the content distributor platform can result from failing, overloaded, or misconfigured resources as well as improper routing configurations and third-party attacks on the content distributor as some examples. User device issues can be due to incompatibilities stemming from the type of user device (e.g., mobile device, tablet, laptop, etc.), resources of the user device (e.g., screen resolution, processor, memory, network bandwidth, etc.), and software configurations or installations as some examples. Issues with respect to the networks used in delivering the content can be due to regional or temporal congestion, insufficient bandwidth, downed links, improper routing, and content restrictions set by network administrators as some examples. Content provider issues can include encoding content in a manner that is incompatible, unsupported, or otherwise sub-optimal for various user devices.

Since the content distributor is tasked with delivering content provider content and ensuring an optimal end user experience, the onus falls on the content distributor to identify and resolve these issues. However, discovery of any of the above identified issues is a challenge in-and-of itself that is only exacerbated by the size and scale of the content distributor. As the content distributor can have multiple points-of-presence (PoPs), each with several servers serving many user devices with different content, continually collecting data from all the data points can overload the content distributor's resources, which can then cause content delivery performance degradation. Collecting too few data points may allow certain issues to go undetected or become detected after the fact. The longer the issues exist, the longer the content distributor performance and user experience is potentially subject to degraded performance.

A secondary problem facing the content distributor is that of transparency. Content providers want insight as to the user experience provided by the content distributor and insight as to how their content is consumed or perceived by the public. Thus, content providers that rely on the content distributor for the delivery of their content expect to receive statistics from the content distributor identifying how their content is being delivered. In other words, monitoring is needed not only to diagnose potential issues, but also to identify content delivery performance to its customers on a per content provider or per content basis.

There is therefore a need for a monitoring system that provides true end-to-end actionable intelligence regarding content delivery performance from the content distributor to each end user in a manner does not adversely affect performance of the content distributor. There is further a need to expose the actionable intelligence to content provider customers so that they too may better understand their end users, content engagement, and quality of experience and to allow the customers the ability to control and adjust the monitoring in a customized manner.

BRIEF DESCRIPTION OF THE DRAWINGS

A preferred embodiment for a client-side beaconing monitoring system will now be described, by way of example only, with reference to the accompanying drawings in which.

DETAILED DESCRIPTION OF PREFERRED EMBODIMENTS

Some embodiments provide a monitoring system for transparently and dynamically monitoring the end-to-end quality of experience that a large distributed content distributor provides to different user devices over different networks. The monitoring system leverages the user devices to beacon back client derived metrics in a reconfigurable telescoping manner such that the granularity, verbosity, and frequency of the monitoring can be controlled and refocused in real-time and on a per content provider customer basis. Reporting granularity is in reference to the depth of monitoring and reporting for a given metric, reporting verbosity is in reference to which metrics are monitored and reported, and reporting frequency is in reference to the monitoring and reporting rate. The monitoring system facilitates the content distributor's internal reporting and diagnostic function as well as the external and customized reporting function exposed to the content distributor's content provider customers. The monitoring system also facilitates a self-healing function, whereby the content distributor can resolve or otherwise workaround detected or potential issues proactively or in a semi or fully autonomous manner.

Figure 1:
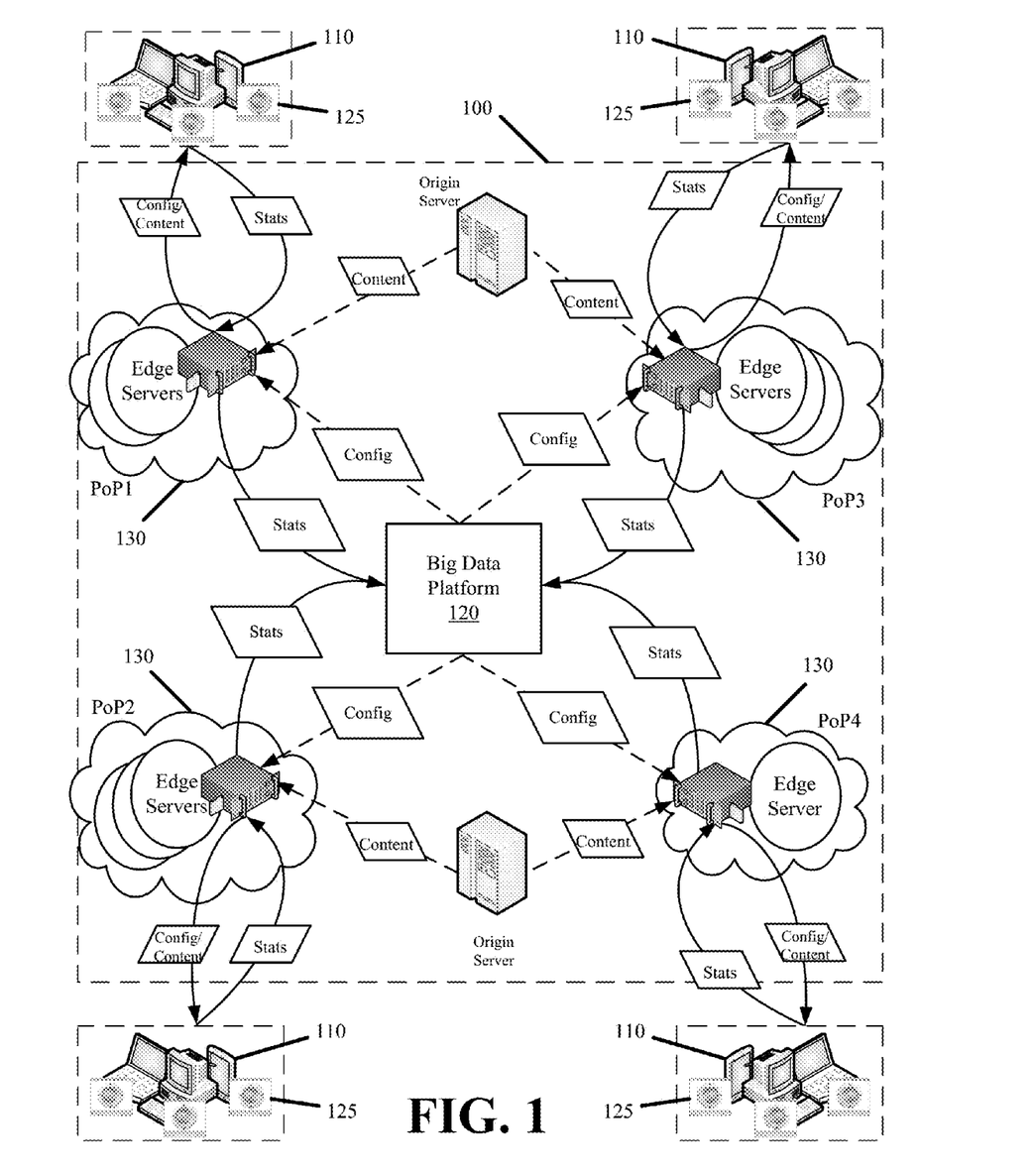
FIG. 1 illustrates components of the monitoring system of some embodiments.

A preferred implementation of the monitoring system is described with reference to the exemplary architecture illustrated by FIG. 1. As shown, the monitoring system is implemented using components and resources of a content distributor 100 and various user devices 110.

The content distributor 100 can be any of a content delivery network (CDN), cloud hosting service provider, and other large-scale distributed caching or proxy service with a distributed set of points-of-presence (PoPs) 130. Each PoP 130 typically includes at least two collocated servers. The servers of a given PoP 130 primarily operate to host and deliver content provider content to different subsets of the user devices 110. In some embodiments, the PoPs 130 optimize content delivery to the user devices 110 by reducing the distance that content needs to travel in order to reach a user device. Specifically, the PoPs 130 are distributed to various edges of the network with each PoP 130 being configured to receive content requests and deliver content to a subset of the user devices 110 that is geographically proximate to that PoP 130. For these reasons, the servers of a PoP 130 are referred to as edge servers.

The edge servers can include separate physical machines that operate with a distinct set of resources or can include a mix of physical machines and virtual machines, wherein two or more virtual machines can operate on the same physical machine hardware using shared or partitioned resources of that physical machine. The edge servers of one PoP can host the same or different content provider content as an edge server of another PoP or edge servers of the same PoP. This provides for redundancy and failover in the event that one PoP edge server or PoP becomes overloaded or fails.

Some embodiments leverage the edge servers as part of the monitoring system. In some such embodiments, the edge servers are used to provide a distributed framework from which to issue configurations to control the granularity, verbosity, and frequency of reporting from each of the user devices 110. The edge servers are also used as a distributed framework to collect client beacon data (i.e., monitoring results and metrics) from different sets of the user devices 110. Consequently, there is no single point to distribute the configurations or single point to collect the client beacon data. Here again, the distributed architecture provides redundancy and failover albeit for the task of distributing configurations and collecting monitoring results.

The edge servers pass the collected monitoring results to the big data platform 120. As such, the big data platform 120 is a central site at which the monitoring system compiles the monitoring results from across the content distributor 100 network. The big data platform 120 also processes the client-side metrics for internal analytics and exposes the compiled client-side metrics for external content provider customer review. In some embodiments, the big data platform 120 uses the compiled client beacon data to diagnose and resolve issues resulting from content distributor resources, different networks over which the served content travels, user devices 110, and content provided by the content provider customers. In some embodiments, the big data platform 120 generates the configurations that control the monitoring and reporting function of the user devices 110. The big data platform 120 distributes the configurations to the edge servers for subsequent distribution to the user devices 110. As such, the big data platform 120 is communicably coupled to the PoPs 130, and more specifically, to one or more of the edge servers within each PoP 130. The big data platform 120 is itself implemented using one or more servers that are special purposed for the big data platform 120 operations.

The user devices 110 include any machine that can directly or indirectly receive and optionally present content from a content distributor. A user device 110 can include a machine with a processor and direct network connectivity with which it receives content from any of the content distributor PoPs 130. A user device 110 can also include a machine that is tethered or otherwise communicably coupled (e.g., via Bluetooth or other communication protocol) to at least one other machine that receives content from any of the content distributor PoPs 130 on behalf of the user device 110.

Each user device 110 becomes a monitoring agent for the monitoring system by execution of a client application 125 instance. The client application 125 runs on a user device 110 and operates to download content to the user device 110 from the content distributor 100 or other third party content distributor while monitoring and reporting performance of the content download back to the monitoring system as client beacon data. In some embodiments, each client application 125 is configured to report the client beacon data back to a specific address that resolves to an edge server that is in closest network proximity to that client application 125. In some embodiments, each client application 125 is configured to report client beacon data back to the edge server it receives content from. Alternatively, one edge server of each PoP 130 may be tasked with collecting client beacon data for that PoP 130. If an edge server receiving client beacon data from a particular client application 125 is overloaded, the edge server can instruct the particular client application 125 to report the monitoring results to another edge server in the same or different PoP 130.

In some embodiments, the client application 125 is a standalone media player application, a download manager, or a website plug-in, script, tool, or add-on application. In some embodiments, the client application 125 is a software development kit (SDK) that is integrated as part of a media player application, download manager, or other application executing on a user device 110. In such instances, the client application 125 itself can be downloaded from the content distributor 100 or any third party content provider or service provider. In still some other embodiments, the client application 125 is directly integrated on a user device 110 as firmware, embedded code, or other native code. In other words, the client application 125 is preinstalled on the user device 110 or integrates with native beaconing capabilities of the user devices 110. These different manifestations allow the client application 125 to be integrated in or run on a multitude of devices across a multitude of platforms including smartphones, tablets, computers, dedicated video gaming machines, media player devices, and other devices running any of the iOS, Android, and Windows operating systems.

The monitoring system includes control plane functionality that allows the big data platform 120 to dynamically configure the reporting function of different sets of client applications 125 in real-time. In other words, the client applications 125 of some embodiments are not restricted to collecting and reporting a static set of metrics at fixed intervals. Using the control plane functionality, the big data platform 120 can respond to certain issues by increasing the reporting granularity, verbosity, and frequency where they are needed while decreasing them where they are not needed. In so doing, the big data platform 120 can provide customized monitoring and reporting on a per content provider customer basis. Such customized reporting enables new mechanisms with which the content distributor 100 and content provider customers of the content distributor 100 can monetize content. In addition to adjusting client application 125 reporting functionality, the big data platform 120 can also issue commands over the control plane to alter the client application 125 operation.

The client applications 125 are capable of monitoring and reporting on hundreds of different metrics related to any of the user device, content, network, and content distributor resources. The monitoring system may define a default set of metrics that all client applications 125 monitor and report. Users that include content provider customers of the content distributor 100 may also select from additional predefined metrics or define their own custom metrics in order to adapt the monitoring and reporting function of the client applications 125 to their specific needs. Examples of some of the client beacon data metrics are provided below:

Player State: Playing, Paused, Loading, Seek, Stopped, Buffering, Player Position Identifiers: User Internet Protocol (IP) Address, Domain Name System (DNS) Address, Customer Identifier, Customer Key, Unique Session Identifier, Unique User Identifier Network: Uniform Resource Identifier (URI), Server Address, Transfer Duration, Number of Bytes Transferred, Number of Media Requests Playback: Playback Start Time, Playback Type, Startup Time, Duration Watched, Number of Dropped Video Frames, Number of Stalls, Buffer Size, Segments Download Duration, Download Overdue, Number of Segments Downloaded Quality of Service (QoS): Observed Bitrate Standard Deviation, Observed Max Bitrate, Observed Min Bitrate, Bitrate Switch, Indicated Bitrate, Observed Bitrate Asset: Asset Name, Resource, Stream URL, Live/Video On-Demand Video Flag, Player Name, Device Type, Viewer Identifier Client/Device: Device Brand, Device Manufacturer, Device Model, Platform, Browser Name, Browser Version, Operating System, Platform Version Other: Connection Type, Content/Video Identifier, Content Type, Delivery Type, Environment, Genre, Player Version, Product Identifier, Purchase Option Identifier, Purchase Type, Show, Streaming Protocol, Custom Device Model As noted above, configurations provided by the monitoring system, through the content distributor 100 platform, controls the granularity, verbosity, and frequency of reporting by each client application 125. Different configurations can be provided to different client applications 125. In so doing, the monitoring system can control the monitoring and reporting of each client application 125 independently. Moreover, the monitoring system can provide different configurations to the same client application 125 at different times in order to dynamically reconfigure the reporting function of that client application 125. Changes to the configurations of any client application can be performed in real-time.

In some embodiments, the configurations that control the monitoring and reporting functions of the client applications 125 are specified as one of an emergency override configuration, customer specified configuration, and default configuration. Emergency override configurations include global emergency override configurations and customer specified emergency override configurations. Each configuration type has a different order of precedence.

Figure 2:
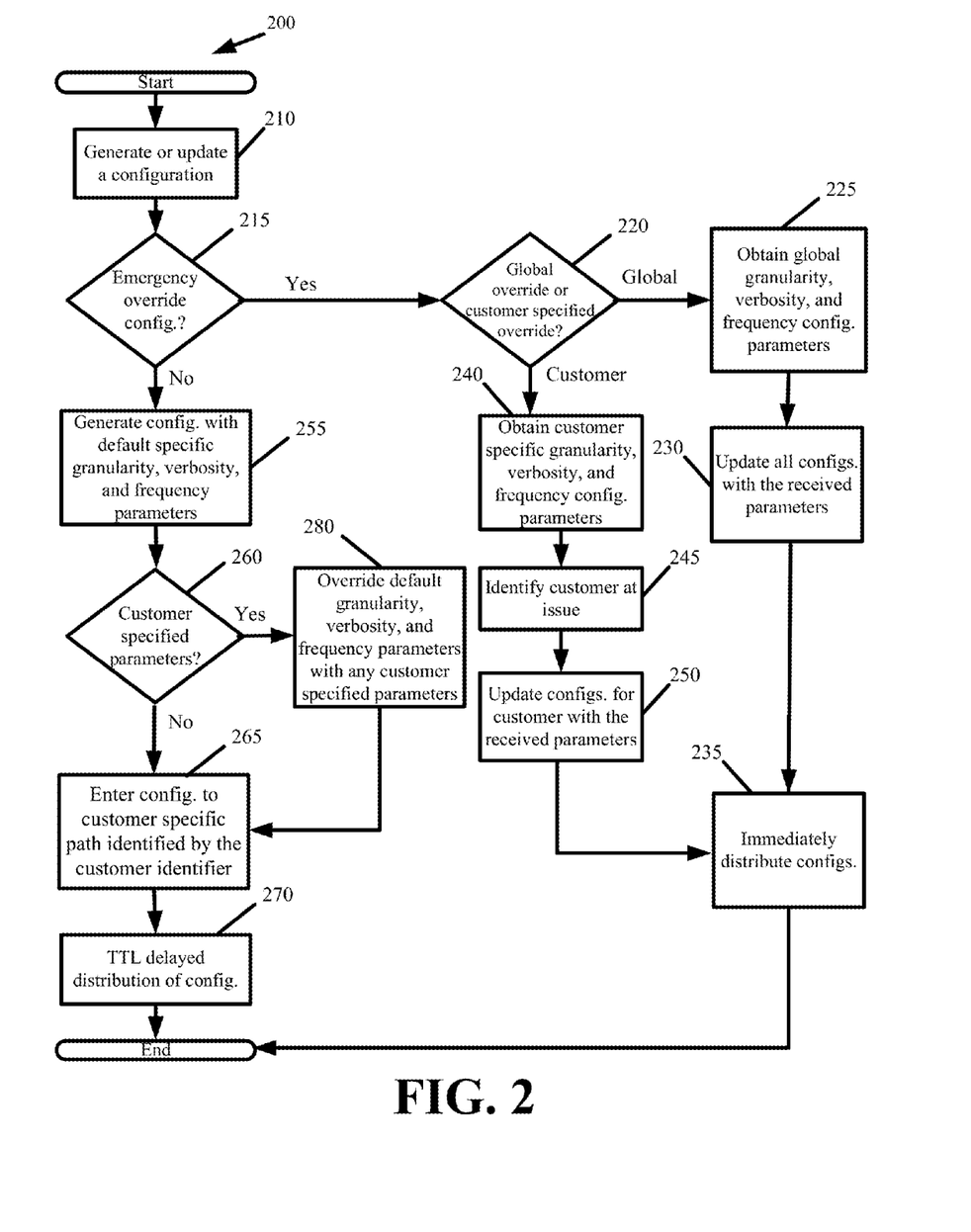
FIG. 2 presents a process for generating different configurations in accordance with some embodiments.

FIG. 2 presents a process 200 for generating different configurations to control different user device monitoring and reporting function in accordance with some embodiments. The process 200 commences when the system generates (at 210) a configuration. Generating a configuration can include updating an existing configuration. In some embodiments, the system automatically generates configurations when certain system or customer specified thresholds are met. Content provider customers may specific parameters for a configuration that the system generates using an interface or application programming interface (API) provided by the content distributor or monitoring system. In some embodiments, a content provider customer is permitted to specify customer specified emergency override configurations, non-override customer specified configurations, and default configurations in order to control the reporting that is provided by client applications receiving that content provider's content.

The process determines (at 215) if an emergency override configuration is being generated. An emergency override configuration can be a temporary configuration that adjusts the reporting function of one or more client applications for the purpose of diagnosing a potential issue affecting those client applications. The emergency override configuration supersedes any default or non-override customer specified configuration in order of precedence. In other words, if a customer specified configuration and an emergency override configuration simultaneously exist for a particular client application, the monitoring and reporting function of the particular client application will be controlled by the emergency override configuration.

When an emergency override configuration is to be generated, the process determines (at 220) if the override configuration has global application or is customer specified. A global override configuration is used in diagnosing an issue that is content provider agnostic or content agnostic. In other words, a global override configuration can be used to diagnose an issue that affects multiple content providers, affects the content distributor distributing content on behalf of different content providers, affects a network over which different content provider traffic is delivered, or affects a class of user devices that receive content of different content providers. Accordingly, a global override configuration can be used to adjust granularity, verbosity, and frequency of reporting for client applications that are affected by a regional issue, network issue, or user device issue, while other client applications unaffected by the issue can continue to operate with their existing configuration. A customer specified override configuration adjusts reporting granularity, verbosity, and frequency of a subset client applications receiving a particular content provider customer's content without affecting the reporting function of other client applications not receiving the particular customer's content.

When a global override configuration is being generated, the process receives (at 225) the granularity, verbosity, and frequency parameters for the global override configuration and updates (at 230) any configurations within the geographic, network, user device, etc. scope of the global override configuration with the global override configuration parameters. The global overridden configurations are then immediately distributed (at 235) to the edge servers and client applications using the propagation procedure described with reference to FIG. 3 below.

When a customer specified override configuration is being generated, the process receives (at 240) the granularity, verbosity, and frequency parameters for the customer specified override configuration, identifies (at 245) the customer at issue, and updates (at 250) the configurations for that customer with the customer specified override configuration parameters. The customer specified override configurations are also immediately distributed (at 235) to the edge servers and client applications using the same propagation procedure as used for the global override configurations.

When an emergency override configuration is not being generated, the process generates (at 255) a configuration with default granularity, verbosity, and frequency parameters. The process then determines (at 260) if customer specified parameters are provided to customize the default configuration. If not, the default configuration is entered (at 265) to a customer specific path identified by a customer identifier. The default configuration is then distributed (at 270) to the edge servers and client applications according to a time-to-live (TTL) parameter. If customer specified parameters are provided, the process overrides (at 280) the default granularity, verbosity, and frequency parameters with any customer specified parameters before entering (at 265) the customer specified configuration to the customer specified path and distributing (at 270) the configuration according to a TTL parameter.

In some embodiments, the configurations are specified and passed as Uniform Resource Locator (URL) query string arguments. Each query string argument is a different key value pair specifying a configuration parameter and a value for that parameter. Thus, the key value pairs can be used to set the reporting granularity, verbosity, and frequency for one or more client applications. The key value pairs can also be used to provide geographic, network, platform, or user agent reporting controls as well as an address where the client beacon data should be sent and an authentication token that the edge servers or big data platform can use to verify the client beacon data. Configuration parameters supported by some embodiments include: Beacon Version; Beacon Endpoint (destination for client beacon data); Frequency; Verbosity; Client Time of Day; Type of Event; Geo Coordinates; Country; State; City; Zipcode; Designated Market Area; Autonomous System Number; Network Address, Connection Type, Device Type, Platform Type, Operating System Version; User Agent; Content Distributor Name.

A URL embedded with any of the above identified configurations can be passed in response to a user invoking a link to request or receive content, in response to client beacon data sent by a client application, and periodically during an established session between an edge server and client application over which content is passed from the edge server to the client application.

An example of a URL containing configuration key value pairs is: config.beacon.net/xyz/beacon?frequency:5&verbosity:1&zip:91121. In this example, the key value pairs specify a reporting frequency of five seconds, a first verbosity level, and control restricting the configuration to user devices in the 91121 zip code. A customer identifier within the URL path identifies the customer or customer content that the configuration is used to monitor. In the above example, "xyz" specifies the customer identifier. Therefore, when a client application submits a request for customer xyz's content or when customer xyz's content is passed to the client application, the monitoring system configures the client application with the xyz customer specified configuration. Global emergency override configuration can be placed in the customer's path or can be stored in a separate path.

Figure 3:
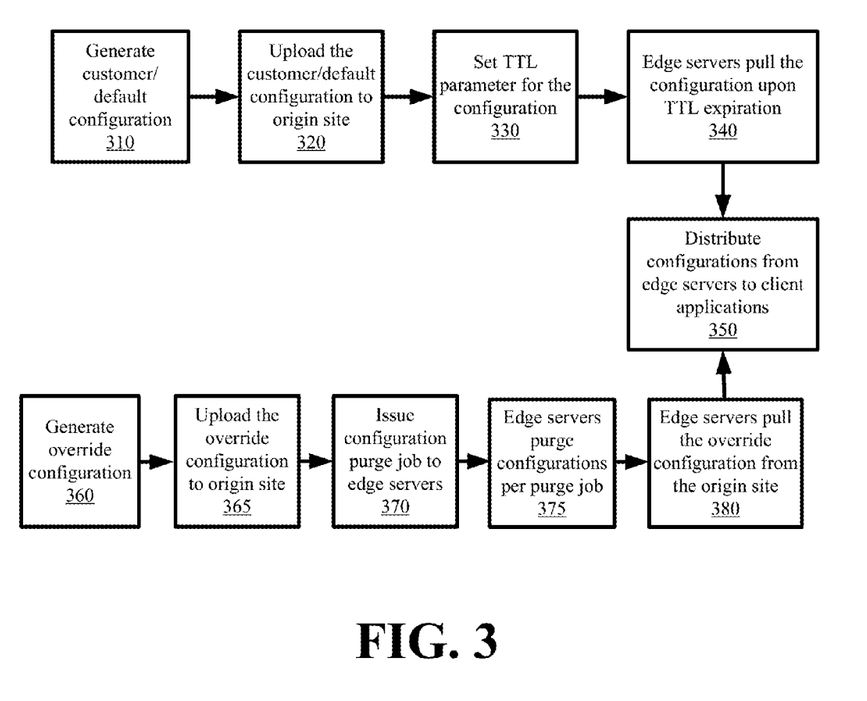
FIG. 3 illustrates dynamic and real-time configuration within the monitoring system in accordance with some embodiments.

An important aspect of the configurations and client application monitoring is the ability of the monitoring system of some embodiments to adjust the reporting function of the client applications dynamically and in real-time. FIG. 3 illustrates dynamic and real-time configuration within the monitoring system in accordance with some embodiments.

When a default or customer specified configuration is generated (at 310), that configuration is uploaded (at 320) to a monitoring system origin site where a TTL parameter is set (at 330) for the configuration. In some embodiments, the monitoring system origin site is a server of the big data platform. The TTL parameter can be customer specified or can be provided by the origin site.

The edge servers that are tasked with disseminating the configurations to the client applications pull default and customer specified configurations from the origin site and temporarily cache the configurations for dissemination to different client applications. The edge servers pull (at 340) a customer specified or default configuration whenever the TTL parameter for a previously retrieved copy of that configuration expires.

The edge servers then distribute (at 350) the configurations to the client applications. In some embodiments, the edge servers distribute the customer specified or default configurations to the client applications when they refresh the configurations at the expiration of the TTL parameters. Each edge servers identifies which client applications are to receive which configurations based on content requests the edge servers receive from the client applications. As long as a download session exists between an edge server and a client application, the edge server will continue to send periodic configuration updates to that client application.

To ensure real-time dissemination of override configurations, the monitoring system employs a different distribution scheme. In some embodiments, when an override configuration is generated (at 360), it is uploaded (at 365) to the origin site. Then a purge job is issued (at 370) from the origin site to the edge servers. The purge job causes the edge servers to purge (at 375) all cached configurations when the override configuration is a global override configuration or will cause the edge servers to purge cached configurations for a given customer when the override configuration is specific to that customer. After purging the appropriate configurations, the edge servers immediately refer to the origin site to pull (at 380) any specified configurations including the override configuration. The edge servers then immediately distribute (at 350) the configurations retrieved after the purge job to the appropriate client applications to ensure that the client application configurations are updated in real-time.

In some embodiments, the same mechanism used to control the monitoring and reporting function of the client applications can be used to control the client application operation. Specifically, the URL key-value pairs can be used to issue commands to the client applications in order to adjust how and what content the client applications request and receive and how that content is processed. The commands can modify a bitrate or encoding at which the client applications request particular content. The commands can also modify which PoPs the client applications request and receive content from, where the client applications report the beacon data, routes to use in receiving content, optimizations to apply to the content or user device including adjusting screen resolution, network selection, etc. Moreover, these commands can be issued globally to all client applications or to specific sets or individual client applications such that the commands can be issued to affect client applications based on the type of user device on which the client application runs, the type of content downloaded by the client application, client application location, or content provider event type. By leveraging the same distribution mechanism, the commands can be issued in real-time.

This command and control functionality allows the monitoring system and content provider customers to optimize the quality-of-service holistically rather than individually. For example, client applications typically attempt to play the highest encoding for particular content. However, the monitoring system may identify that a geographic region in which a set of user devices operate is congested. The set of user devices therefore fight for the available bandwidth, leading to a poor user experience. To improve the user experience for the set of user devices, the monitoring system can issue commands to cause the set of user devices to request and receive a lower encoding, thereby reducing the congestion in that geographic region and improving the quality of experience for all users.

The command and control functionality also enables content provider customers to provide differentiated quality-of-service in a customized manner. For example, from the client beacon data, a customer can identify a first set of user devices that operate on wired broadband connections and a second set of user devices that operate on limited 3G wireless connections. The customer can then issue configurations with commands to cause the client applications of the first set of user devices to request a higher quality encoding of particular content and the client applications of the second set of user devices to request a lower quality encoding of the particular content. As a another example, the client beacon data can identify client applications operating on different subscription tiers and configurations with commands can be issued to differentiate the quality of content that is delivered to subsets of client applications operating on different subscription tiers while maintaining the overall quality of experience.

In some embodiments, the URL key-value pair mechanism used to pass configurations from the edge servers to the client applications is adapted to report the client beacon data from the client applications to the edge servers. In some such embodiments, the client beacon data is passed as key value pairs that are specified as query string arguments of a GET HyperText Transfer Protocol (HTTP) request URL. The GET request may include an authentication token in the message header. In some embodiments, the client beacon data is passed in the body of a POST HTTP request using JavaScript Object Notation (JSON) formatting. The POST request may also include an authentication token in the message header.

Figure 4:
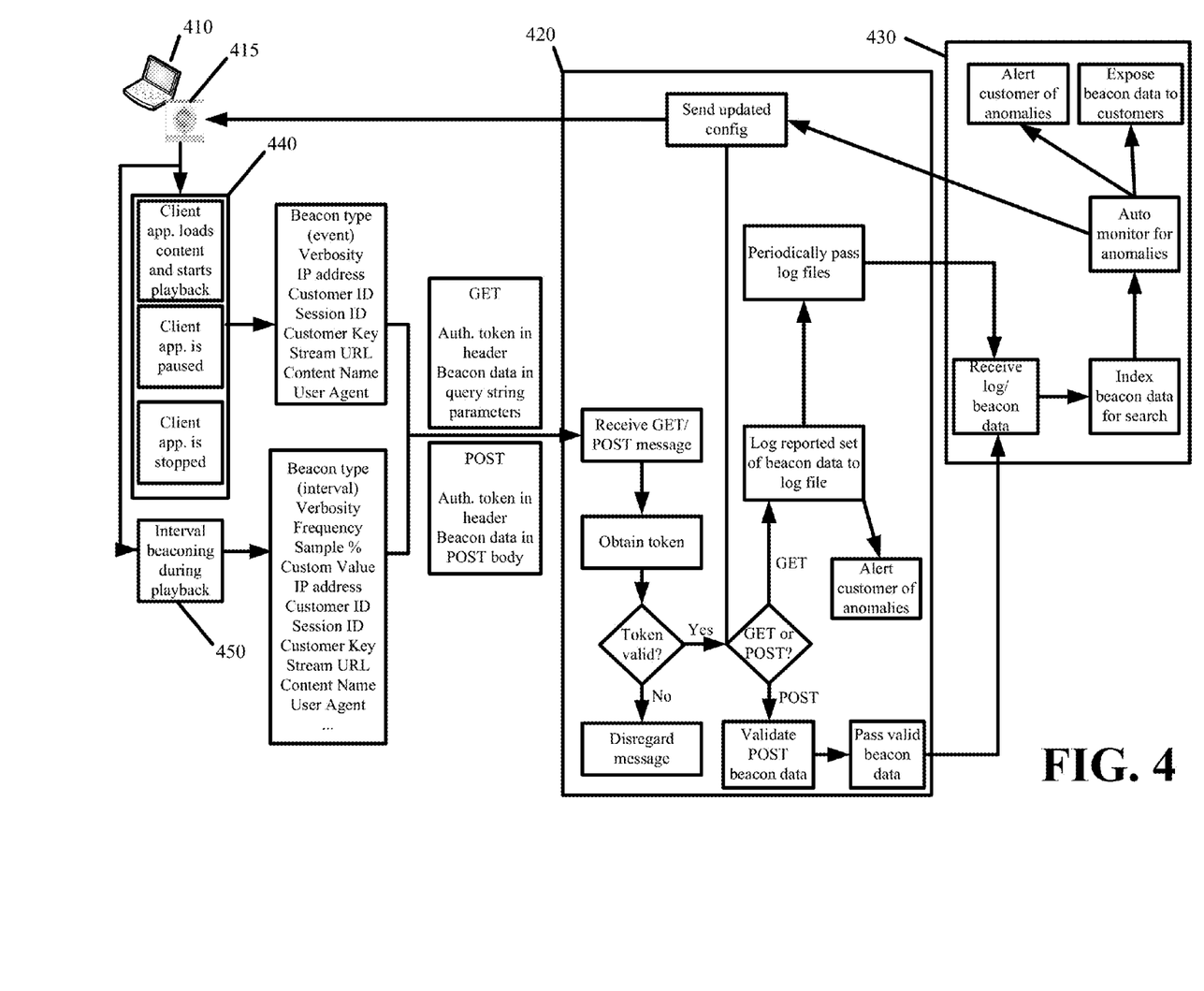
FIG. 4 depicts the flow of client beacon data through the monitoring system in accordance with some embodiments.

FIG. 4 depicts the flow of client beacon data through the monitoring system in accordance with some embodiments. Specifically, the figure depicts the flow of client beacon data from a client application 415 running on a user device 410 to an edge server 420 to the big data platform 430.

In this figure, the client application 415 reports client beacon data to the edge sever 420 whenever one of a specified set of events occurs 440. In other words, when a specified event occurs, the client application 415 monitors that specified event, generates metrics related to that specified event, and reports the generated metrics to the edge server 420 in the form of client beacon data. The events that the client application 415 monitors and the metrics reported for each monitored event is specified as part of a configuration provided to the client application 415. With reference to FIG. 4, three events occur that cause the client application 415 to report to the edge server 420. The first event fires when the client application 415 loads and begins playing content. In response to the first event firing, the client application 415 sends a first set of beacon data to the edge server 420. The second event fires when a user pauses the content playback. In response to the second event firing, the client application 415 sends a second set of beacon data to the edge server 420. The third event fires when the user stops the content playback. In response to the third event firing, the client application 415 sends a third set of beacon data to the edge server 420.

The client application 415 also sends 450 sets of beacon data back to the edge server 420 periodically. This is referred to as interval based beaconing. The interval based beaconing frequency and the metrics reported at each reporting interval are specified as part of the client application 415 configuration.

Each set of beacon data in this figure identifies the beacon type, the level of reporting verbosity, the user device Internet Protocol (IP) address, a customer identifier, a session identifier, a customer key, a URL identifying the content at issue, content name, and information about the user device (i.e., user agent).

As shown, the client application 415 passes the client beacon data to the edge server 420 using either a GET or POST request. As noted above, the client beacon data can be passed as query string arguments of the GET request URL or can be passed within the body of the POST request. To minimize the burden on the edge server 420, the client application 415 may perform a first processing of the client beacon data prior to sending the data to edge server 420. The edge server 420 can throttle the rate at which the client application 415 passes the client beacon data to the edge server 420.

When the edge server 420 receives the reported set of beacon data from the client application 415, the edge server 420 authenticates the client application 415. The authentication ensures that beacon data comes from client applications provisioned and under control of the monitoring system. The authentication also allows the monitoring system to ignore client beacon data from compromised client applications or when the reported client beacon data is corrupted, anomalous, or invalid.

To perform the authentication, the edge server 420 extracts the authentication token from the GET or POST request. The edge server 420 then determines if the token is valid. If not, the request and its contents are ignored. If the token is valid, the edge server may pass an updated configuration in the response to the client application 415 GET or POST request. The updated configuration can be used to adjust the granularity, verbosity, or frequency for the beacon data reported by the client application 415. If the token is valid, the edge server 420 also determines if the beacon data is reported using a GET or POST request.

For a GET request, the edge server 420 extract and logs the client beacon data that is included as part of the GET request URL query string arguments. The resulting log files are periodically passed to the big data platform 430. For a POST request, the edge server 420 validates the beacon data or JSON formatted data within the POST request body. Invalid data is discarded while valid data is passed to the big data platform 430.

The edge server 420 can optionally process the client beacon data prior to passing it to the big data platform 430. This processing can include analyzing the client beacon data to determine if any content provider customer specified triggers are fired in which case the edge server can issue an alert to notify the content provider of an issue. For example, a content provider customer may set a trigger to be alerted when a user is unable to play content of the content provider, halts playback within ten seconds, or receives a poor user experience as quantified by an amount of buffering, throughput, etc. Additionally, the edge server 420 can dynamically generate commands to pass back to the client application 415 in order to alter client behavior. Such functionality is described below in further detail.

The big data platform 430 processes any received client beacon data to make the data searchable. In some embodiments, the processing involves indexing the beacon data. The indexed data can be stored to a database. In this manner, the beacon data is archived so that reports and diagnostics can be provided using or against historic data.

The big data platform 430 then produces various internal performance dashboards using relevant indexed beacon data. The internal dashboards illustrate past and current content delivery performance. These internal dashboards can be used by the content distributor to monitor health and performance of the content distributor. The internal dashboards can also be used to generate reports for various content provider customers of the content distributor. In other words, the dashboards can be customized for different customers by populating the dashboard with client beacon data that is collected from client applications receiving that content provider's content. The dashboards can be interactive allowing the user to drill-down to different sets or individual items of beacon data. The indexed beacon data is also exposed to customers via external dashboards or APIs. Specifically, a content provider customer can access a content distributor portal to configure and view custom dashboards that report on the content delivery performance for that content provider's content. The content provider can drill down through the dashboards to present the performance more granularly (e.g., regionally). Content providers can also create their own custom dashboards using indexed beacon data that is relevant to them and that is made accessible through the APIs.

Figure 5:
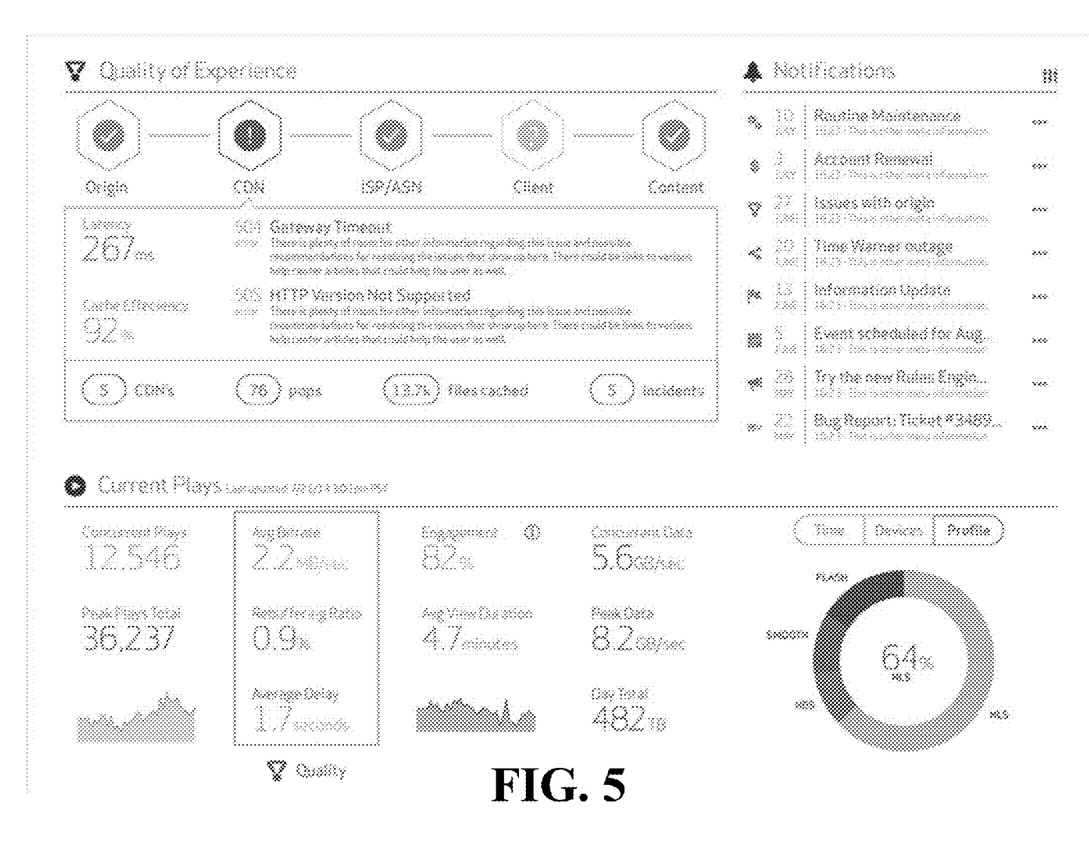
FIGS. 5 and 6 illustrate two dashboards generated by the big data platform in accordance with some embodiments.
Figure 6:
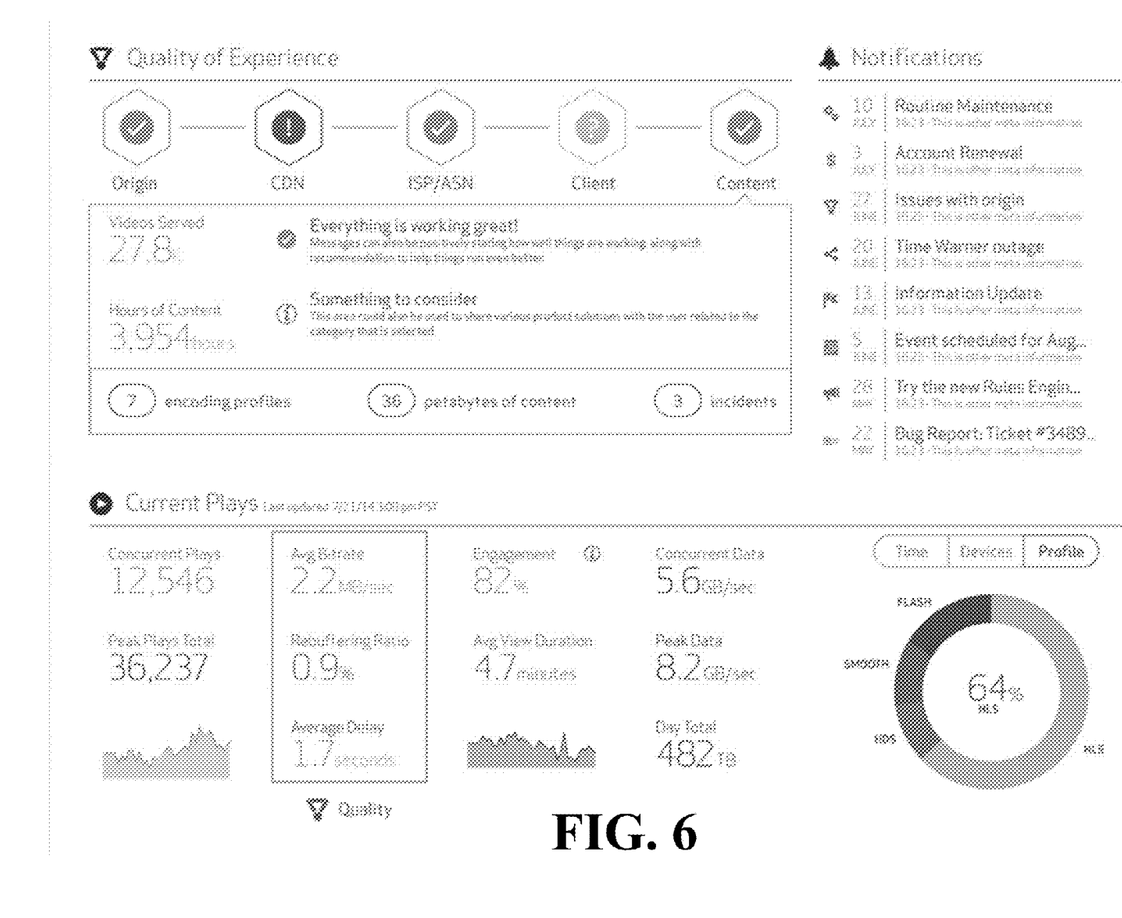

FIGS. 5 and 6 illustrate two dashboards generated by the big data platform in accordance with some embodiments. The dashboards are interactive and break up the reporting to identify performance on an origin, content distributor, network, user device, and content basis. Each dashboard provides a set of aggregate metrics related to content delivery performance. The dashboard of FIG. 5 also includes content distributor or CDN specific metrics such as the latency and cache efficiency of the content distributor as well as any content distributor specific errors or issues, whereas the dashboard of FIG. 6 further identifies metrics and issues that are directed specifically to the playback of the content being monitored. Each dashboard interface provides different insight as to where potential issues may lie while also providing performance on a per customer basis. Based on the customer identifier specified in the beacon data reported by the client applications, the big data platform is able to identify which set of beacon data is relevant for which customer dashboard.

These dashboards allow customers and system administrators the ability to respond in a proactive manner by identifying potential issues before they affect content delivery performance or before the performance degradation becomes widespread. For example, using the dashboards, a system administrator can identify that user devices in one geographic region are receiving slower performance than user devices in other geographic regions. The system administrator can generate an override configuration that is region specific to cause the client applications running on the user devices in the affected region to increase their reporting granularity, verbosity, and frequency. With the additional and more detailed client beacon data, the system administrator can better evaluate what may be causing the issue and respond in kind. For example, the system administrator may identify that a route to that geographic region is experiencing heavy congestion and the system administrator reconfigures the edge servers to deliver content to the affected geographic region using an alternate route.

With reference back to FIG. 4, the big data platform 430 also performs an automated monitoring process to automatically detect any abnormalities or anomalies. For any detected issues, the big data platform 430 can adjust the reporting granularity, verbosity, and frequency for user devices affected by the detected issue. The big data platform 430 can then issue an updated configuration to those user devices in order to increase the level of reporting by those affected user devices, thereby allowing for a more in-depth inspection and diagnosis of the issue. Additionally or alternatively, for any detected issue, the big data platform 430 can issue an alert to a system administrator or content provider customer that is affected by the issue so that they can take proper corrective action.

System administrators and content provider customers can set thresholds that are used as part of the automated monitoring process. The thresholds are conditioned on the beacon data that is reported back by the client applications running on the user devices. The thresholds can be based on beacon data for individual user devices or beacon data for some aggregate set of devices. For example, a content provider customer can specify an individual alert that fires when content delivery throughput from the content distributor to a particular user device is below a certain amount. The content provider customer can alternatively specify an aggregate alert that fires when content delivery throughput to user devices in a specific region or to a specified device is below a certain amount. In this manner, the big data platform can perform different automated monitoring for different customers.

For each configured threshold, an administrator or customer can also set an action that the big data platform takes when the threshold is met. The action can include any of changing configuration parameters and providing an alert in real-time via email, text message, instance message, or other real-time communication means. The change in configuration parameters when propagated to the client applications running on the user devices can cause those client applications to alter the granularity, verbosity, and frequency of monitoring and reporting as well as cause the client applications to download different content based on device type, content type, location, or event type as some examples.

Some embodiments leverage the client beacon data to provide a self learning and self healing solution. Specifically, the big data platform aggregates historic client beacon data to identify benchmarks for expected performance. The big data platform automatically generates a set of thresholds from the set of benchmarks. For example, the big data platform can identify an average throughput to user devices in a particular geographic region based on client beacon data reported over a period of a month. The average throughput is then used to set a threshold for expected throughput to the particular geographic region. Should observed performance deviate from the generated thresholds, the platform can take corrective action on its own by issuing alerts to system administrators or by adjusting client application configuration or operation automatically.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers.

Examples of computer-readable media include, but are not limited to, CD-ROMs, flash drives, RAM chips, hard drives, EPROMs, etc.

Figure 7:
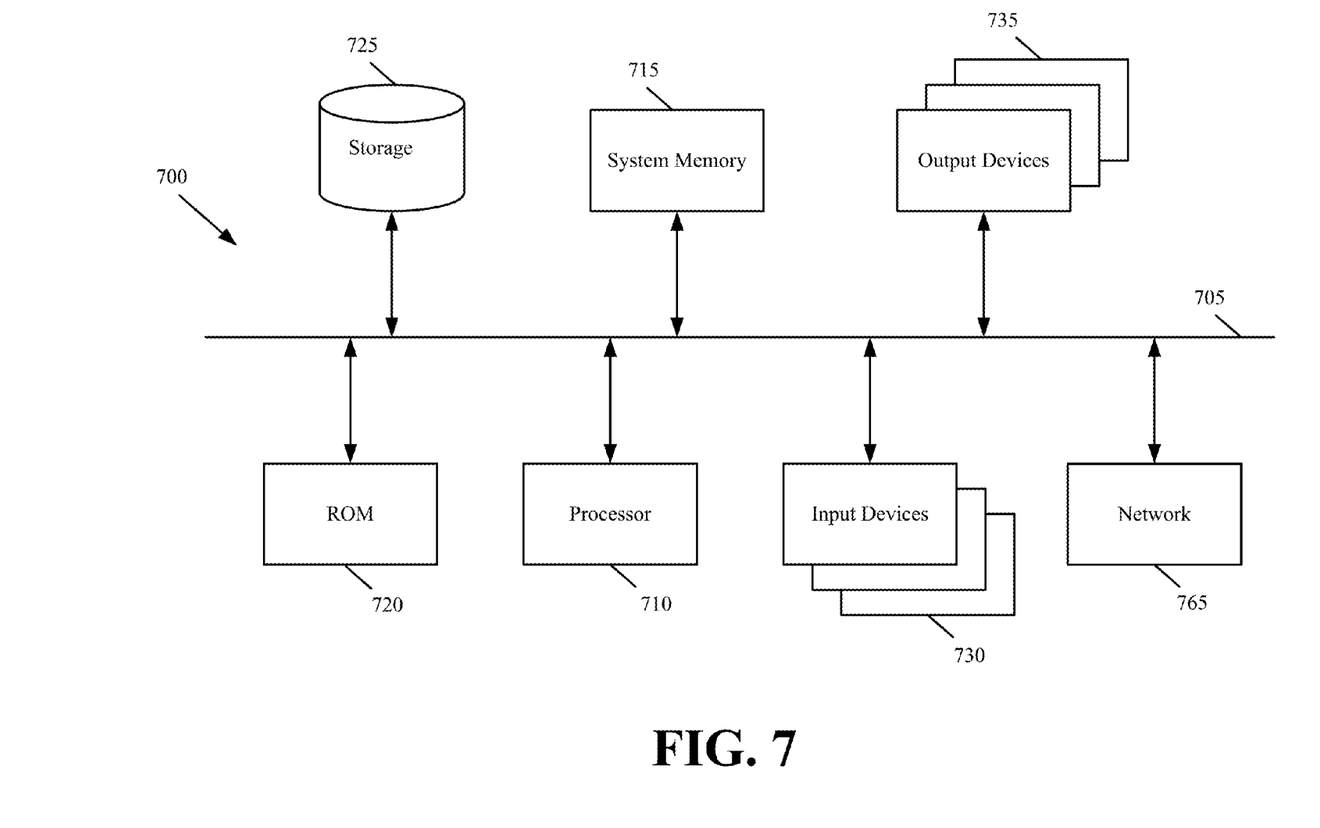
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., edge servers, big data platform, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the embodiments described above. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state disk, or optical disk and its corresponding disk drive) as the permanent storage device 725.

Other embodiments use a removable storage device (such as a flash drive or solid-state disk) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices (also called "cursor control devices"). The input devices 730 also include audio input devices (e.g., microphones, MIDI musical instruments, etc.). The output devices 735 display images generated by the computer system. The output devices include printers and display devices, such as liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 700 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A configurable client-beacon monitoring system comprising:
    a plurality of client applications running on a plurality of user devices;
    a plurality of content distribution servers (i) serving a plurality of content to the plurality of client applications in a distributed manner, (ii) configuring reporting metrics, granularity, verbosity, and frequency of the plurality of client applications, and (iii) receiving different sets of metrics with different reporting granularity, verbosity, and frequency from the plurality of client applications in response to said configuring,
        wherein said configuring comprises serving a first configuration to a first set of the plurality of client applications receiving first content of a first content provider and serving a second configuration to a second set of the plurality of client applications receiving second content of a second content provider,
        wherein serving the first configuration comprises configuring a first time-to-live (TTL) parameter and at least one of the granularity, verbosity, and frequency with which the first set of client applications monitor and report a first set of the different sets of metrics relevant to delivery of the first content provider content until expiration of said first TTL parameter, and
        wherein serving the second configuration comprises configuring a second TTL parameter and at least one of the granularity, verbosity, and frequency with which the second set of client applications monitor and report a different second set of the different sets of metrics relevant to delivery of the second content provider content until expiration of said second TTL parameter;
    a big data platform compiling the different sets of metrics from the plurality of content distribution servers, generating a first content provider performance report based on the first set of metrics relevant to delivery of the first content provider content, and generating a second content provider performance report based on the second set of metrics relevant to delivery of the second content provider content.

2. The system of claim 1, wherein the big data platform further detects an issue in the different sets of metrics that affects a subset of the plurality of client applications.

3. The system of claim 2, wherein the big data platform further adjusts any of the reporting granularity, verbosity, and frequency of the subset of client applications by distributing an override third configuration through the plurality of content distribution servers to each client application of the subset of client applications.

4. The system of claim 1, wherein the first set of client applications monitor and report the first set of metrics to the plurality of content distribution servers according to the first configuration and the second set of client applications monitor and report the second set of metrics to the plurality of content distribution servers according to the second configuration.

5. The system of claim 1 further comprising a plurality of geographically distributed Points-of-Presence (PoPs), each PoP of the plurality of PoPs comprising at least two of the plurality of content distribution servers.

6. A method comprising:
providing a first configuration to a plurality of client applications, wherein said providing comprises passing a Uniform Resource Locator (URL) with a first set of query string arguments defining granularity, verbosity, and frequency with which each particular client application of the plurality of client applications measures and reports a first set of metrics related to content that is delivered to that particular client application;
receiving the first set of metrics from each of the plurality of client applications;
detecting an anomaly adversely affecting delivery of said content based on the first set of metrics received from a subset of the plurality of client applications;
distributing an override second configuration to each client application of the subset of client applications as a result of detecting said anomaly adversely affecting delivery of said content, wherein said distributing comprises passing a different second set of query string arguments reconfiguring each particular client application of the subset of client applications by changing monitoring and reporting from the first set of metrics to a different second set of metrics related to the content that is delivered to that particular client application and by increasing one or more of granularity, verbosity, and frequency with which each particular client application of the subset of client applications measures and reports the second set of metrics;
receiving the second set of metrics instead of the first set of metrics from the subset of client applications with an increase to said one or more of the granularity, verbosity, and frequency defined by the override second configuration while continuing to receive the first set of metrics from other client applications of the plurality of client applications with original granularity, verbosity, and frequency defined by the first configuration; and
reverting reporting operation of the subset of client applications to the first configuration in response to resolution of the anomaly adversely affecting delivery of said content.

7. The method of claim 6, wherein the second set of metrics comprises a new metric not reported within the first set of metrics.

8. The method of claim 6 further comprising generating an alert in response to detecting said anomaly and notifying at least one content provider whose content is delivered to any of the subset of client applications with said alert.

9. The method of claim 6 further comprising passing content of a first content provider to each of the plurality of client applications.

10. The method of claim 9, wherein detecting the anomaly comprises identifying that performance identified in the first set of metrics received from the subset of client applications is below a threshold set by the first content provider and that performance identified in the first set of metrics received from other client applications of the plurality of client applications exceeds the threshold.

11. The method of claim 6, wherein the override second configuration comprises a set of commands changing the content that is downloaded by the subset of client applications.

12. The method of claim 6 further comprising decreasing at least one of the reporting granularity, verbosity, and frequency of at least one client application of the plurality of client applications not in the subset of client applications while diagnosing the anomaly.

13. The method of claim 6, wherein receiving the first set of metrics from a particular client application comprises receiving a URL with a plurality of query string arguments, the plurality of query string arguments encoding the first set of metrics.

14. A configurable client-beacon monitoring system comprising:
a plurality of geographically distributed Points-of-Presence (PoPs) distributing first content provider content to a first user device and second content provider content to a second user device, wherein each PoP of the plurality of PoPs comprises at least one content distribution server, the content distribution server comprising a cache for storing content provider content and a network interface for communicating with any of a plurality of user devices;
a monitoring and configuration server comprising at least one processor, the monitoring and configuration server:
configuring monitoring and reporting function of the first user device by leveraging the plurality of PoPs to pass a first configuration to the first user device, wherein the first configuration specifies a first monitoring verbosity and frequency for the first content provider content;
configuring monitoring and reporting function of the second user device by leveraging the plurality of PoPs to pass a second configuration to the second user device, wherein the second configuration specifies a second monitoring verbosity and frequency for the second content provider content that differs from the verbosity and frequency of the first configuration;
receiving from the plurality of PoPs, first metrics reported by the first user device at the first monitoring verbosity and frequency and second metrics reported by the second user device at the second monitoring verbosity and frequency;
detecting from the first metrics and the second metrics, a performance issue affecting the first user device and the second user device; and
reconfiguring the monitoring and reporting function of the first and second user devices with an override configuration before expiration of a time-to-live (TTL) parameter associated with the override configuration and reverting the first user device back to the first configuration and the second user device back to the second configuration after expiration of the TTL, wherein said reconfiguring comprises passing said override configuration to the plurality of PoPs for distribution to the first and second user devices from the plurality of PoPs, wherein the override configuration specifies (i) a third monitoring verbosity and frequency for the first and second content provider content and (ii) said TTL parameter setting a duration at which the first and second user devices monitor and report according to the override configuration.

15. The system of claim 14, wherein the content distribution server cache is further for storing a copy of the first configuration and the second configuration and for refreshing the copy of the first configuration by retrieving a new copy of the first configuration at the expiration of said TTL parameter.

16. The system of claim 14, wherein the monitoring and configuration server modifies download operation of the first user device by passing a set of commands through the plurality of PoPs to the first user device.

17. The system of claim 1, wherein serving the first configuration comprises passing a first set of query string arguments defining the granularity, verbosity, and frequency with which the first set of client applications monitor and report the first set of metrics, and wherein the serving the second configuration comprises passing a different second set of query string arguments defining the granularity, verbosity, and frequency with which the second set of client applications monitor and report the different second set metrics.

* * * * *